United States Patent [19]

Rouverol

[11] 3,824,873

[45] July 23, 1974

[54] ROLLING CONTACT GEARING

[76] Inventor: William S. Rouverol, Boite Postale No. 8, 20-Saint Florent, Corse, France

[22] Filed: Dec. 18, 1970

[21] Appl. No.: 99,587

[52] U.S. Cl. .............................................. 74/462
[51] Int. Cl. ........................................... F16h 55/06
[58] Field of Search ......................... 74/462, 424.5

[56] References Cited
UNITED STATES PATENTS

| | | | |
|---|---|---|---|
| 2,308,558 | 1/1943 | Wildhaber | 74/462 |
| 2,951,053 | 8/1960 | Reuter et al. | 308/DIG. 9 |
| 3,232,134 | 2/1966 | Kluwe et al. | 74/462 |
| 3,371,552 | 3/1968 | Soper | 74/462 |

*Primary Examiner*—Leonard H. Gerin
*Attorney, Agent, or Firm*—Gordon Wood

[57] ABSTRACT

A form of gearing with teeth having circular arc profiles and a particular pressure angle which together produce engagement and disengagement in pure rolling. The shearing action tangential to the tooth profiles associated with compressive deformation of the tooth faces is made to exactly offset the shearing action in the opposite direction imposed by the meshing of the teeth.

55 Claims, 6 Drawing Figures

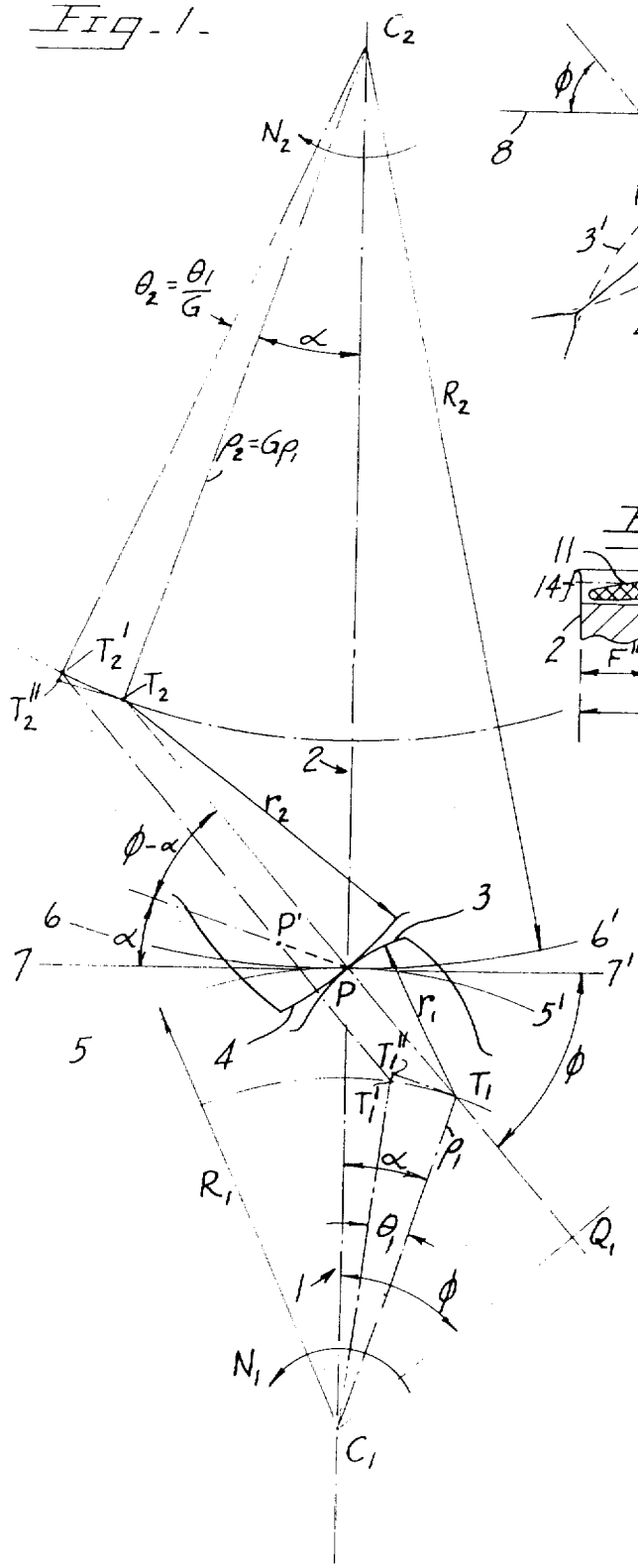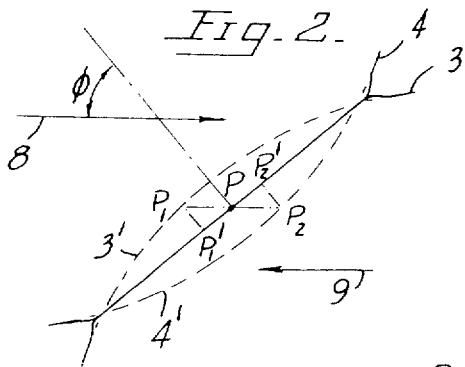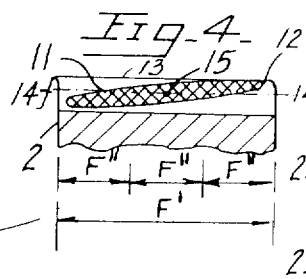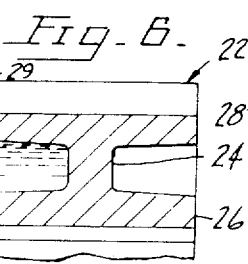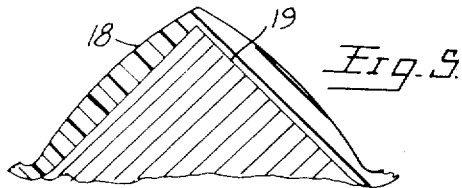
INVENTOR.
WILLIAM S. ROUVEROL
BY
Gordon Wood.

ROLLING CONTACT GEARING

This invention relates to the profile and shape of gear teeth. Specifically, it discloses a type of gearing that eliminates sliding between the engaging tooth surfaces and hence operates in pure rolling contact. It is particularly adapted for use with "pitch-point-action gearing" as disclosed in U.S. Pat. No. 3,438,279 and can be applied to all forms of parallel axis and intersecting axis gearing.

All gearing heretofore devised has been shaped and proportioned so that considerable sliding between mating teeth takes place during both engagement and disengagement. Involute gears, for example, with a pressure angle of 20°, a gear ratio of unity, and the minimum number of teeth without undercutting, have a sliding velocity of the teeth as they come into or leave contact that is more than two-thirds of the pitch line velocity. Sliding velocities in tooth systems other than the involute system, including the cycloidal, Vickers-Bostock-Bramley, and Wildhaber-Novikov systems, are of the same order of magnitude.

In all these previously known tooth systems the highest sliding velocities occur on tooth surfaces carrying the full normal load, and this inevitably promotes considerable frictional heating and wear. If the gears are made of metal, the adverse effects of heating and wear can be largely eliminated by providing copious lubrication. However proper lubrication of metal gear transmissions has heretofore required the use of a housing or case, gaskets, fill and drain plugs, oil seals, etc., all of which add considerably to the cost of the transmission. In the case of gears made of softer moldable materials, such as plastics or elastomers, copious lubrication also improves performance, but not greatly. All of these materials have extremely low thermal conductivity and very poor resistance to abrasion and as a result their power capacity is not sufficient to enable them to compete effectively with steel as a gear material in any designs that employ lubricant housings. In designs that do not employ lubricant housings, on the other hand, molded gearing has shown itself to have such a minimal power capacity and brief service life that in most applications it cannot even compete with standard V-belt systems. It is for these reasons that molded gearing has not been widely used despite its low cost.

The object of the present invention is therefore to provide a form of gearing which will operate in pure rolling, with no sliding between the teeth, so as to eliminate the need for bath lubrication of steel or other metallic gears, and which will also be adapted for use with moldable materials such as plastics and elastomers, enabling these softer materials to transmit large amounts of power without appreciable heating or wear.

A further object of the invention is to provide gearing that is more efficient, durable and inexpensive than either involute gears made of steel or standard V-belt drives.

A further object of the invention is to provide a form of gearing which will operate with the least possible noise even when the teeth are made of the hardest materials, and which will be free from any tendency for the teeth to climb onto each other when they are made of the softest elastomers.

The means to achieve these and other objects and advantages of the invention will be evident from the drawings as explained in the specification that follows:

FIG. 1 is a schematic partial section of a pair of parallel axis mating gears taken perpendicularly to the pitch line and showing mating profiles embodying the invention.

FIG. 2 is an enlarged view of the region in FIG. 1 near the pitch point P when the mating gears of FIG. 1 are transmitting torque and the tooth surfaces are therefore slightly flattened at the point of contact.

FIG. 3 is a schematic diagram of the total surface deformations of particular tooth profile points in FIG. 2.

FIG. 4 is a normal partial sectional view of a helical gear showing schematically the sloping elliptical contact area that is developed between fully-loaded mating teeth.

FIG. 5 is an enlarged partial section through a gear tooth in the normal direction, illustrating a tooth construction wherein a soft resilient moldable material is bonded onto a metallic substructure.

FIG. 6 is a half-section of a spur gear showing a grease-packed reservoir in the web.

In detail, and referring to FIG. 1, a driving pinion generally designated 1 engages a driven gear generally designated 2 at the pitch point P. Pinion 1 is centered at $C_1$, has pitch radius $R_1$, pitch circle 5—5', and typical tooth profile 3. Gear 2 5–centered at $C_2$, has pitch radius $R_2$, pitch circle 6–6' and typical tooth profile 4. Other parts of the two gears, such as hubs, webs, rims, keyways, etc., are standard and are omitted in the interest of clarity.

The teeth for which the profiles 3, 4 are shown in FIG. 1 are similar to those disclosed in U.S. Pat. No. 3,438,279, except that they are conceived of as not necessarily being helical. That is, they may under some circumstances be straight spur teeth. However they violate the "law of gearing" in the same way as those of the earlier patent, being nonconjugate in that the undeformed profiles 3, 4 are in contact only at the pitch point P, and are separated everywhere else. This is brought about by giving the profiles of mating teeth a relative radius of curvature $r$ at the pitch point P that is less than the relative radius of curvature of involute or other conjugate teeth. Mathematically this means that the following relation must obtain:

$$1/[(1/r_1) + (1/r_2)] < \sin \phi/[(1/R_1) + (1/R_2)] \quad (1)$$

where $\phi$ is the pressure angle and $r_1$ and $r_2$ are the radii of curvature of tooth profiles 3, 4 of pinion 1 and gear 2 respectively.

It is convenient to specify $r_1$ and $r_2$ in the following way:

$$r_1 = K_1 R_1 \sin \phi \quad (2)$$

and $$r_2 = K_2 R_2 \sin \phi \quad (3)$$

where $K_1$ and $K_2$ are the "separation rate" factors for the pinion 1 and gear 2 respectively. Since the radii of curvature at the pitch point P for involute profiles would be $R_1 \sin \phi$ and $R_2 \sin \phi$, equations 2 and 3 indicate whether each tooth profile radius $r_1$, $r_2$ is larger or smaller than that of an involute profile, and by what factor ($K_1$, $K_2$). A negative value for either $K_1$ or $K_2$ indicates what profile is concave. For the special case when $K_1$ and $K_2$ are equal, they must be positive and will then be designated simply as K, a common separation rate factor. For simplicity and clarity the ensuing derivations of the conditions that must be fulfilled to achieve rolling contact will be carried out in terms of a common separation rate factor K, but the invention should not be construed as restricted to this special case.

Referring again to FIG. 1 it will be observed that the radius of curvature $r_1$ is about 45 percent as long as the line $PQ_1$. Since the line $PQ_1$ is the radius of curvature $R_1 \sin \phi$ for an involute profile at the pitch point P, it is evident that for the particular case illustrated in FIG. 1, $K_1$ is equal to about 0.45. In this particular case the same separation rate factor has been employed for $r_2$, so $K_2$ is also 0.45 and triangles $C_1 T_1 P$ and $C_2 T_2 P$ are similar and related by the scale factor G, which is also the velocity ratio:

$$G = \omega_1/\omega_2 \tag{4}$$

$\omega_1$ and $\omega_2$ being the angular velocities of pinion 1 and gear 2 respectively, in radians per second. G is always greater than unity.

In order to obtain a mathematical expression for the amount of separation $\Delta$ between undeformed profiles 3 and 4 as they move beyond the pitch point P, it is necessary to derive an expression for the lengthening of the line $T_1 T_2$ that occurs when the pinion 1 turns through a small angle $\theta_1$, and the gear 2 turns through an angle $\theta_2 = \theta_1/G$. When this turning takes place the center of curvature $T_1$ of the pinion 1 moves to $T_1'$, and the corresponding center $T_2$ for the gear 2 moves to $T_2'$. If instead of moving to points $T_1'$ and $T_2'$ the profile arc centers $T_1$ and $T_2$ had moved along lines perpendicular to the lines $T_1 C_1$ and $T_2 C_2$, that is to point $T_1''$ and $T_2''$, there would have been no change in the length of the line $T_1 T_2$. This is because arcs $T_1 T_1'$ and $T_2 T_2'$ are both equal to $\rho_1 \theta_1$ ($\rho_1$ being the length of line $T_1 C_1$), and their projections parallel to $\rho_1$ and $\rho_2$, namely $T_1 T_1''$ and $T_2 T_2''$ respectively, are substantially equal and for the case of a common separation rate factor K also parallel. A figure embracing points $T_1$, $T_2$, $T_2''$ and $T_1''$ would thus be substantially a parallelogram.

However points $T_1$ and $T_2$ do not move on a straight line but rather on circular arcs, and the lengthening of line $T_1 T_2$ is therefore equal to the sum of the projections of the short lines $T_1' T_1''$ and $T_2' T_2''$ in the direction of the line $T_1 T_2$. Since $T_1' T_1''$ is parallel to $\rho_1$, its projection $\Delta_1$ onto $T_1 T_2$ is as follows:

$$\Delta_1 = (T_1' T_1'')(T_1 Q_1)/\rho_1 \tag{5}$$

A close approximation for the length of the short line $T_1' T_1''$ may be obtained from the approximate expression for the thickness of a narrow segment of a circle as a function of the half-chord and the radius:

$$(T_1' T_1'') = (T_1 T_1'')^2/2\rho_1 \tag{6}$$

Nothing that for small angles $\theta_1$, $T_1 T_1''$ is approximately equal to the arc length $\rho_1 \theta_1$ and that the length of line $T_1 Q_1$ is $R_1 (1-K) \sin \phi$ we obtain the following expression for the contribution $\Delta_1$ by the pinion to the lengthening of the line $T_1 T_2$:

$$\Delta_1 = (R_1 \theta_1^2/2)(1-K) \sin \phi \tag{7}$$

The corresponding expression for the contribution $\Delta_2$ for the gear is:

$$\Delta_2 = (R_2 \theta_2^2/2)(1-K) \sin \theta = (R_1 \theta_1^2/2G)(1-K) \sin \phi \tag{8}$$

The total increase in length of the line $T_1 T_2$, which is the separation of profiles 3 and 4 associated with a small angle of turn $\theta_1$ of the pinion 1, is therefore:

$$\Delta = (R_1 \theta_1^2/2)(1 + [1/G])(1 - K) \sin \phi \tag{9}$$

It will be evident from this expression that if K is unity, as for involute gears or circular arc profile gears having the same radius of curvature as involute gears, $\Delta$ must be equal to zero and there is consequently no separation for such profiles, at least not anywhere near the pitch point.

Derivation of an expression analogous to equation 9 for cases where $K_1$ and $K_2$ are not equal is complicated by the fact that the line of arc centers $T_1 T_2$ does not remain substantially parallel to itself as the separation increases, but by a coordinate approach an expression can be obtained. It is as follows:

$$\Delta = (R_1 \theta_1^2/2)(1 + [1G])(1 - [r/r_i]) \sin \phi \tag{10}$$

where $r$ and $r_i$ are the left and right sides of equation 1 respectively.

In order to obtain the rate at which separation occurs, equation 9 or 10 may be differentiated with respect to time. In the case of equation 9 the result is:

$$V_d = R_1 \theta_1 \omega_1 (1 + [1/G])(1 - K) \sin \phi \tag{11}$$

where $\omega_1$ is as before $d\theta_1/dt$, the angular velocity of pinion 1 and $V_d$ is the velocity of separation (or approach) of undeformed profiles 3, 4. In the case of mating gears transmitting torque, $V_d$ is the velocity of tooth surface compression or decompression in the plane of rotation for teeth making initial contact when a point on profile 3 at the pitch radius $R_1$ is removed from the pitch point P by an arc distance $R_1 \theta_1$.

When tooth profiles are laid out with a large pressure angle $\theta$, as in FIG. 1, it becomes quite evident that compression of the tooth faces must inevitably be associated with a tendency for the driving tooth 3 to ride up over the tip of the driven tooth 4. The magnitude of this riding-up tendency may be evaluated with the aid of FIG. 2. In this figure, which is an enlargement of the region around the pitch point in FIG. 1, tooth profiles 3 and 4 are flattened for a short distance on each side of pitch point P as a result of the application of static torque to the pinion 1 and gear 2.

In FIG. 2 arrows 8 and 9 indicate the directions in which the profiles 3 and 4 would be urged by the application of this static torque to pinion 1 and gear 2. Broken lines 3' and 4' indicate the profile positions that would be taken if the teeth did not impinge on each other. A point $P_1$ on profile 3—3' which is at point P before there is any surface compression will stay at P during compression if the coefficient of friction is high enough to prevent sliding between the tooth surfaces. If on the other hand there is perfect lubrication of the tooth surfaces, $P_1$ will move to $P_1'$. An analogous situation exists for point $P_2$ on profile 4—4'. The total effect is shown schematically in FIG. 3, in which the total surface compression $\Delta$ is associated with a shearing action $\Delta_t$, which represents shear deformation of the tooth material or relative tangential displacement of the tooth surfaces, depending on whether or not there is sliding between the tooth surfaces. Both effects are intended to be covered by the term "shearing action" and the magnitude of $\Delta_t$ is evident from FIG. 3:

$$\Delta_t = \Delta \tan\phi \tag{12}$$

The $\Delta$ in this expression is the same as that of equation 9 or 10 so that by differentiation with respect to time we may again obtain an expression in terms of velocities:

$$V_t' = V_d \tan\phi \tag{13}$$

The substitution of equation 11 into this equation gives the relative velocity $V_t'$ with which the teeth tend to ride up over each other during engagement as a result of tooth surface compression:

$$V_t' = R_1\theta_1\omega_1(1 + [1/G])(1 - K)\sin\phi \tan\phi \tag{14}$$

Those skilled in the art will be aware that there is another kind of shearing action that occurs between gear teeth. This is the sliding or shear deformation associated with the meshing of the teeth, and it is always in exactly the opposite direction to the velocity $V_t'$ of equation 14. That is, it is toward the roots of the teeth during engagement and in the opposite direction during disengagement. The magnitude of this velocity, $V_t''$, which is a relative velocity tangential to the tooth profiles 3, 4, may be found by reference again to FIG. 1.

If sufficient torque is being transmitted by pinion 1 and gear 2, instead of being separated by the distance $\Delta$ of equation 9 when $T_1$ and $T_2$ have moved to $T_1'$ and $T_2'$ respectively, the tooth profiles 3 and 4 may be in contact at point $P'$, at a distance from pitch point $P$ equal to $PP'$. In this case there will tend to be shearing action (sliding or shear deformation) between engaging profiles of the following relative velocity:

$$V_t'' = V_{e_1} - V_{e_2} \tag{15}$$

where $V_{e_1}$ and $V_{e_2}$ are the components of tooth velocity tangential to the tooth profiles 3, 4 for pinion 1 and gear 2 respectively.

In the case of pinion 1, the tangential component of velocity $V_e$ is equal to the angular velocity $\omega_1$ of the pinion 1 times the perpendicular distance from point $P'$ to line $C_1Q_1$. That is, $$V_{e_1} = \omega_1 [R_1 \sin\phi + PP' \cos(\phi - \alpha)] \tag{16}$$

Similarly, the corresponding tangential component of velocity $V_{e_2}$ for the gear is equal to the angular velocity $\omega_2$ of the gear 2 times the perpendicular distance from point $P'$ to a line (not shown) through point $C_2$ parallel to line $C_1Q_1$. That is, $$V_{e_2} = \omega_2[R_2 \sin\phi - PP' \cos(\phi - \alpha)] \tag{17}$$

In the case of a set of mating gears having a common separation rate factor K, the angle $\alpha$ between the line of centers and a line from $C_1$ to $T_1$ is the same for both pinion 1 and gear 2.

When the velocities of equations 16 and 17 are substituted into equation 15, the sine terms cancel, (since $\omega_1 R_1$ and $\omega_2 R_2$ are both expressions for the pitch line velocity) and we obtain:

$$V_t'' = (\omega_1 + \omega_2) PP' \cos(\phi - \alpha) \tag{18}$$

For the case where $K_1$ and $K_2$ are equal, $PP'$ is to a close order of approximation equal to $T_1T_1'$ or $T_2T_2'$ or $\rho_1\theta_1$. Substituting the last of these, $\rho_1\theta_1$, and also the following identities:

$$\omega_1 + \omega_2 = \omega_1(1 + [1/G]) \tag{19}$$

and $$\rho_1 \cos(\phi - \alpha) = R_1 \cos\phi \tag{20}$$

we obtain for the relative tangential velocity of engagement and disengagement the following expression:

$$V_t'' = R_1\theta_1\omega_1(1 + [1/G]) \cos\phi \tag{21}$$

To obtain gear teeth that engage in pure rolling, the shearing actions expressed by equations 14 and 21 must be made substantially equal. Fortunately both are linear in $\theta_1$ and contain several common terms, so that setting the right-hand sides of these two equations equal yields a very simple expression:

$$\tan^2\phi = (1/1-K) \tag{22}$$

This expression, which is conveniently explicit in $\phi$ and K, indicates that for very small values of K (short tooth profile radii), the pressure angle $\phi$ approaches 45°. On the other hand if K is unity, as for involute teeth, the pressure angle goes to 90° indicating that pure rolling contact is not possible with involute gears.

To a reasonable order of approximation, the expression corresponding to equation 22 for gears with different separation rate factors may be shown to be:

$$\tan^2\phi = 1/[1 - (r/r_i)] \tag{23}$$

in which all terms are as defined above.

An examination of FIG. 1 indicates that because the contact point moves away from pitch point $P$ in a direction parallel to $T_1T_1''$ or $T_2T_2''$, rather than along the pressure line, the line of contact $PP'$ makes a much smaller angle $\alpha$ with a line 7—7' tangent to the pitch circles 5—5' and 6—6' than does the pressure angle. For this reason the contact line will intersect the addendum circles much further away from the pitch point $P$ than is the case with involute gears. In general, gearing made according to the present invention will have a contact ratio up to two or three times that of involute gearing of the same pressure angle and addendum height. This affords obvious advantages in terms of torque and power capacity independently of the extent to which equation 22 or 23 may or may not be satisfied. In addition, the larger contact ratios enable the above specifications to be applied to spur gears as well as helical gears, with reasonable continuity of action, particularly in gear sets where the torque load tends to be fairly constant.

It is important to observe in connection with equations 22 and 23 that the use of tooth profiles that satisfy one of these equations will assure pure rolling contact only in gear sets that are also designed to avoid "climbing." Climbing is a phenomenon which occurs mainly in gear sets in which the teeth of one or both gears are made of a soft resilient material such as plastic or elastomer. The high deformation of such materials under load causes the circular pitch of the driving tooth to effectively increase and that of the driven tooth to decrease. If considerable torque is applied to such gears a condition arises that is similar to what would occur if one attempted to mate gears of different circular pitch: the top land of the driven gear, instead of fitting down between the teeth of the driving gear during engagement, rides up onto or over the top land of the incoming driving gear teeth, and the gear set must then either break or lock itself against further rotation, or both.

Involute gears are extremely susceptible to this difficulty for the reason that the contact area rectangle in the cause of spur gears (or a parallelogram in the case of helical gears) is not diminished in height in proportion as it is displaced from the pitch line: in other words, the tooth load at the initial point of engagement, where climbing takes place, is as great as it is at the pitch point.

It is therefore a safe generalization to say that involute profiles should never be used for plastic or elastomer gears, except in cases where no significant torque or power is to be transmitted. Circular arc profiles, on the other hand, such as described in this specification and in U.S. Pat. No. 3,438,279, are ideally suited for use with these softer materials. The separation characteristic expressed mathematically in equations 9 and 10 causes the height of the contact area to diminish according to its distance from the pitch line, and in a set of properly designed gears the tooth load can be made to go to zero at the exact point where contact starts. In other words, in a set of correctly designed gears embodying the present invention the tooth deformation is fully taken into consideration and there is no tendency whatsoever for climbing to occur.

In the case of helical gears embodying the instant invention, the contact area is a long thin ellipse or ellipse-like figure 11, such as shown in FIG. 4. In correctly designed gears the outermost extremity 12 of this ellipse is substantially tangent to the addendum surface 13 of the gear 2 when the gear 2 is transmitting the maximum allowable torque. If the end 12 of this ellipse 11 is considerably inside the addendum surface 13 there will be a portion of the teeth that is never utilized. On the other hand if the teeth are so fine that the end 12 of the ellipse 11 is truncated by the addendum surface 13, there will be an inclination for the teeth to climb when heavily loaded.

To place the end of the contact ellipse 11 substantially tangent to the addendum surface 13 the following equation should be satisfied:

$$\frac{e}{h} = \frac{C_R C_\phi \sin^{1.7}\phi (1-\nu^2) q_o n_1}{\pi \sin^{0.3}\psi \cos^{0.65}\psi}$$

$$\left(\frac{K^2}{[K(1-K)]^{0.65}}\right)\left(\frac{1}{E_1} + \frac{1}{E_2}\right)\left(\frac{G}{1+G}\right) \quad (24)$$

where $$C_R = 2(1 + \sqrt{1 + [\pi/Gn_1 K \sin^2\phi \tan\phi]}) \quad (25)$$

and $$C_\phi = \tfrac{1}{2}(1 + \sqrt{1 + [4\pi/C_R n_1 K^2 \sin^2\phi \tan\phi]}) \quad (26)$$

In this equation the symbols not heretofore identified and defined are as follows:

$e =$ distance from the pitch circle to the outer extremity of the contact ellipse measured in the plane of rotation perpendicular to the pressure angle.

$h =$ distance from the pitch circle to the end of the gear 2 tooth measured in the same way.

$\nu =$ Poisson's ratio for the softer of the mating pair.

$n_1 =$ number of teeth on the pinion.

$q_o =$ maximum allowable surface stress in the center of the contact ellipse at maximum torque.

$E_1 =$ modulus of elasticity in compression for pinion 1.

$E_2 =$ modulus of elasticity in compression for gear 2.

$\psi =$ helix angle.

Correct proportioning of helical teeth requires that the $e/h$ ratio given by equation 24 be unity or a bit less. Failure to evaluate this ratio may lead to improperly proportioned teeth such as those specified in the example given in U.S. Pat. No. 3,438,279, which was filed prior to the development of equation 24. In that example an application of equation 24 would have required the number of teeth to be reduced to between 5 and 20, depending on the velocity ratio G. The number of contact points would also have been reduced, to 3 or 4, and the theoretical power capacity increased by about 30 percent.

It should also be noted in connection with FIG. 4 that it is not essential to have a complete contact ellipse 11 contained on a single tooth surface. Thus instead of a face width F' (measured in the helix direction) a gear might have a narrower face width F'' in which case the central portion of the contact ellipse 11 will be on a tooth surface intersected by the pitch line 14—14' but the end portions instead of being to the right and left of the center portion would appear on the surfaces of the immediately preceding and succeeding teeth. This possibility results from the large contact ratio characteristic of this type of gearing, as noted above, and it is not unusual for 3 or 4 or even 5 successive teeth on one gear to be in contact at the same time. However the centroid of these several successive spatially separated segments of the full contact ellipse 11 will still be at point 15, where the pitch line 14-14' intersects the tooth surface containing the central portion of the contact ellipse 11. In view of this it is probably appropriate to describe this type of gearing as having "pitch-point-action" even though there may be separate segments of the contact ellipse 11 that are removed from the pitch line.

A further point should be noted in connection with gear sets having fewer than 3 or 4 contact points. The smoothest possible power transmission will be obtained from sets that have an integral number of full contact ellipses, even though they may be made up of two or more segments appearing on successive teeth. This condition is easily met by selecting a helix angle $\psi$ that gives an integral value for the ratio of the face width times the tangent of the helix angle divided by the circular pitch.

In addition to the climbing problem, the other principle shortcomings of plastic and elastomer gears are overheating and wear. It is essentially these difficulties that prevent the realization of the full potentialities of a gear such as the example given in U.S. Pat. No. 3,438,279, which would need an elaborate cooling system to achieve its rated capacity, and even with such a system would have an objectionable wear rate. With regard to heating, the problem is a dual one of too much heat generation and too poor heat dissipation. The heat generation comes from two primary sources: tooth sliding and tooth material hysteresis. Of these the first may be eliminated by designing gears to have pure rolling contact with the aid of equation 22 or 23 as indicated above. The hysteresis heating, on the other hand, is best controlled by utilizing tooth surface materials that are as hard as possible, as thin as possible, and have good rebound (i.e., low hysteresis). A hard, thin tooth surface has low deformation so that the work of compression, which provides the basis for the hysteresis loss, is minimized.

FIG. 5 shows a section through a gear tooth designed for minimum hysteresis, inasmuch as the molded surface 18 (normally elastomer) is quite thin. In addition this thin surface 18 is supported on a metallic substructure 19, which not only greatly reduces tooth surface deformation but provides a path for conducting away the heat generated in the tooth surface material 18. The thermal conductivity of say die-cast aluminum, for example, is of the order of 1,000 times that of hard rubber.

Other methods of facilitating heat dissipation may be envisaged, such as mating a metal gear with a plastic or elastomer gear. The latter gear would serve to maximize capacity, which so far as the materials are concerned is solely a function of the $q_o^2/E$ ratio, and the former would serve to conduct away the hysteresis heat generated in the latter. In extreme cases, as for example when speeds of rotation are very high, radial fins in the web of one or both gears can generate an air movement that greatly improves heat dissipation.

So far as wear is concerned, it is substantially eliminated by designing for pure rolling contact as indicated above. The avoidance of heat-buildup as by the methods suggested in the preceding two paragraphs is also essential to the obtaining of absolute minimum wear rates. In the case of steel gears, the problems are somewhat different. Metal-to-metal contact may be as deleterious to gears moving in pure rolling as it is to ball or roller bearings. Because of the extremely high surface pressures employed in steel gearing, fretting corrosion can initiate in a matter of minutes if no lubricant is present.

In gearing embodying the present invention, however, the usual transmission case that provides bath lubrication is not needed. As with rolling contact bearings, a simple grease-packed reservoir can provide sufficient lubricant to allow for several thousand hours of operation. Such a reservoir is shown in FIG. 6, which is a radial section of a gear 22 with a grease-packed reservoir 23 on one side of the web 24, contained by a cover plate 25 fixed to the hub 26 but which has a slight amount of clearance 27 between itself and the rim 28. This construction enables a suitable semifluid lubricant to be fed by centrifugal action to one end of the teeth 29 in response to the kind of local heating that results from inadequate lubrication. Generally the reservoir 23 should be located on the side of the gear 22 that has the leading edge of the teeth 29 if it is a driving gear and the trailing edge of the teeth 29 if it is a driven gear, so that the lubricant will be squeezed across the tooth face in the desired direction by the rolling contact ellipse (see FIG. 4).

The forces tending to move the lubricant in the lengthwise direction of the teeth are comparatively minor compared to the effect of the rolling contact ellipse in squeezing the lubricant in the radial direction. This squeezing will be toward the tips of the teeth of the driving gear and toward the roots of the teeth of the driven gear. The latter can be a useful effect to offset the tendency of centrifugal force to move the lubricant outward toward the tips of the teeth. Other things being equal, this may in most cases by a sufficient reason for placing the lubricant reservoir 23 in the driven gear rather than the driving gear.

In addition to lubrication with the semifluid lubricants normally used in grease-packed ball or roller bearings, steel gearing of the type herein disclosed can often be satisfactorily lubricated with solid lubricants such as molybdenum disulfide, anti-seizing phosphate compounds, etc. Unlike the situation where a semifluid lubricant is fed to the tooth surfaces at a particular point and one seeks to wipe or squeeze it in a prescribed direction, the maximum service life of a solid lubricant is obtained under conditions where there is the minimum displacement of the lubricant film. This may be achieved by offsetting the squeeze-film effect of the rolling contact ellipse by a slight amount of sliding in the opposite direction, such as may be achieved by making the velocity $V_t''$ (equation 18) slightly larger than $V_t'$ (equation 14). In effect the desideratum is to make the pressure angle $\phi$ slightly smaller than the value given by equation 22 or 23 by an amount best determined by experimentation. Another reason for making the pressure angle $\phi$ somewhat smaller than the value given by equation 22 or 23 is to take account of shaft bending under load, the effect of which is to increase the center distance $C_1-C_2$ and thereby to increase the pressure angle $\phi$.

The specific description given above of the preferred form of the invention should not be taken as restrictive as it will be apparent that various modifications in design may be resorted to by those skilled in the art without departing from the scope of the following claims. In these claims the following phrases should be construed as having the following meanings: "shearing action" is intended to cover either tangential sliding or shear deformation depending on whether the coefficient of friction between engaging surfaces is exceeded; "pitch surface" means the surface of revolution that would be described by the pitch line as it moved about the gear axis at a fixed radius; "addendum surface" means the corresponding surface of revolution described by the tips or top lands of the teeth of a gear; "soft resilient" material means a material with a modulus of elasticity in compression of less than one million pounds per square inch. In all configurations involving a concave tooth profile, it is to be assigned a negative value in the expressions in the claims involving its radius of curvature; and "pressure angle" means the projection onto the plane of rotation of the angle between the common normal to the tooth contact surfaces at the pitch point and the common plane tangent to the pitch surfaces; and "diametral pressure angle" means the angle between the transverse tooth profile and a radial line which crosses it at the given diameter, by which definition any undercut will give diametral pressure angles of less than 0°.

I claim:

1. A pair of mating gears comprising a driving gear and a driven gear turned by pressure exerted by the teeth of said driving gear, mechanical means connected to said driven gear to remove power therefrom, said teeth being formed to have active profiles in planes perpendicular to the pitch line for which the pressure angle is greater than 40°, the active portion of said profiles of one of said pair being curved, a portion of one working surface of the teeth of one of said pair intersecting the pitch circle of said one of said pair, and both flanks of each of said teeth on one of said pair having at all points diametral pressure angles of at least 0°.

2. A pair of mating gears according to claim 1 wherein said teeth extend across the rims of said gears in a direction slantingly disposed with respect to the pitch line of said pair.

3. A pair of mating gears according to claim 1 wherein the radially outermost extremity of the contact area developed between meshed teeth is adjacent to but not truncated by the tip of the teeth of one of said pair when said pair is transmitting the maximum allowable torque.

4. A pair of mating gears according to claim 1 wherein said profiles extend on both sides of the pitch surfaces of said pair.

5. A pair of mating gears according to claim 1 wherein the centers of curvature of said active profiles of the teeth of one of said pair are substantially removed from the pitch surface of said one of said pair.

6. A pair of mating gears according to claim 1 wherein said profiles are circular arcs.

7. A pair of mating gears according to claim 1 wherein the active profiles of said teeth in the normal plane are circular arcs.

8. A pair of mating gears according to claim 1 wherein the square of the cotangent of the pressure angle in planes normal to said pitch line is substantially equal to one minus the quotient of the relative radius of curvature of said profiles times the sum of the reciprocals of the pitch radii of said pair divided by the sine of said pressure angle.

9. A pair of mating gears according to claim 1 wherein a semifluid lubricant is stored in at least one recess in one of said pair.

10. A pair of mating gears according to claim 1 wherein the tooth surfaces of one of said pair are treated with a solid lubricant.

11. A pair of mating gears according to claim 1 wherein the engaging surfaces of said teeth of one of said pair are formed of a soft resilient material supported by a metallic substructure.

12. A pair of mating gears according to claim 1 wherein said teeth of one of said pair are formed of a moldable material.

13. A pair of mating gears according to claim 1 wherein one of said pair has teeth of soft resilient material and the other has teeth of metal adapted to facilitate heat dissipation from said one of said pair.

14. A pair of mating gears according to claim 1, wherein both said gears are external.

15. A pair of mating gears according to claim 1, wherein the number of teeth on said gears differs by more than two.

16. In a pair of mating gears:
teeth formed to have nonconjugate profiles in sections perpendicular to the pitch line of said pair,
said profiles having a relative radius of curvature at said pitch line smaller than the sine of the pressure angle in said sections divided by the sum of the reciprocals of the pitch radii of said pair, whereby separation of said profiles is effected at all profile positions removed from said pitch line when said pair is in mesh but not transmitting torque,
said pressure angle being greater than 40°, whereby the shearing action tangential to said tooth profiles associated with compressive deformation of the tooth faces when said pair is transmitting torque offsets most of the shearing action in the opposite direction imposed by the meshing of said teeth.

17. A pair of mating gears according to claim 16 wherein said teeth extend across the rims of said gears in a direction slantingly disposed with respect to the pitch line of said pair.

18. A pair of mating gears according to claim 16 wherein the radially outermost extremity of the contact area developed between meshed teeth is adjacent to but not truncated by the tip of the teeth of one of said pair when said pair is transmitting the maximum allowable torque.

19. A pair of mating gears according to claim 16 wherein said profiles extend on both sides of the pitch surfaces of said pair.

20. A pair of mating gears according to claim 16 wherein the centers of curvature of said active profiles of the teeth of one of said pair are substantially removed from the pitch surface of said one of said pair.

21. A pair of mating gears according to claim 16 wherein said profiles are circular arcs.

22. A pair of mating gears according to claim 16 wherein the active profiles of said teeth in the normal plane are circular arcs.

23. A pair of mating gears according to claim 16 wherein the square of the cotangent of the pressure angle in planes normal to said pitch line is substantially equal to one minus the quotient of the relative radius of curvature of said profiles times the sum of the reciprocals of the pitch radii of said pair divided by the sine of said pressure angle.

24. A pair of mating gears according to claim 16 wherein a semifluid lubricant is stored in at least one recess in one of said pair.

25. A pair of mating gears according to claim 16 wherein the tooth surfaces of one of said pair are treated with a solid lubricant.

26. A pair of mating gears according to claim 16 wherein the engaging surfaces of said teeth of one of said pair are formed of a soft resilient material supported by a metallic substructure.

27. A pair of mating gears according to claim 16 wherein said teeth of one of said pair are formed of a moldable material.

28. A pair of mating gears according to claim 16 wherein one of said pair has teeth of soft resilient material and the other has teeth of metal adapted to facilitate heat dissipation from said one of said pair.

29. In a pair of mating gears:
teeth formed to have nonconjugate profiles in sections perpendicular to the pitch line of said pair,
said profiles having a relative radius of curvature at said pitch line smaller than the sine of the pressure angle in said sections divided by the sum of the reciprocals of the pitch radii of said pair, whereby separation of said profiles is effected at all profile positions removed from said pitch line when said pair is in mesh but not transmitting torque,
said pressure angle being greater than 45°, whereby the shearing action tangential to said tooth profiles associated with compressive deformation of the tooth faces when said pair is transmitting torque offsets all of the shearing action in the opposite direction imposed by the meshing of said teeth.

30. A pair of mating gears according to claim 29 wherein said teeth extend across the rims of said gears in a direction slantingly disposed with respect to the pitch line of said pair.

31. A pair of mating gears according to claim 29 wherein the radially outermost extremity of the contact area developed between meshed teeth is adjacent to but not truncated by the tip of the teeth of one of said pair when said pair is transmitting the maximum allowable torque.

32. A pair of mating gears according to claim 29 wherein said profiles extend on both sides of the pitch surfaces of said pair.

33. A pair of mating gears according to claim 29 wherein the centers of curvature of said active profiles of the teeth of one of said pair are substantially removed from the pitch surface of said one of said pair.

34. A pair of mating gears according to claim 29 wherein said profiles are circular arcs.

35. A pair of mating gears according to claim 29 wherein the active profiles of said teeth in the normal plane are circular arcs.

36. A pair of mating gears according to claim 29 wherein the square of the cotangent of the pressure angle in planes normal to said pitch line is substantially equal to one minus the quotient of the relative radius of curvature of said profiles times the sum of the reciprocals of the pitch radii of said pair divided by the sine of said pressure angle.

37. A pair of mating gears according to claim 29 wherein a semifluid lubricant is stored in at least one recess in one of said pair.

38. A pair of mating gears according to claim 29 wherein the tooth surfaces of one of said pair are treated with a solid lubricant.

39. A pair of mating gears according to claim 29 wherein the engaging surfaces of said teeth of one of said pair are formed of a soft resilient material supported by a metallic substructure.

40. A pair of mating gears according to claim 29 wherein said teeth of one of said pair are formed of a moldable material.

41. A pair of mating gears according to claim 29 wherein one of said pair has teeth of soft resilient material and the other has teeth of metal adapted to facilitate heat dissipation from said one of said pair.

42. In a pair of mating gears:
teeth formed to extend across the rims of said gears in a direction slantingly disposed with respect to the pitch line of said pair,
said teeth being formed to have nonconjugate active profiles in sections perpendicular to said pitch line as a result of having a relative radius of curvature at said pitch line smaller than the sine of the pressure angle in said sections divided by the sum of the reciprocals of the pitch radii of said pair, whereby separation of said profiles is effected at all points removed from said pitch line when said pair is in mesh but not transmitting torque,
said gears and said teeth having a relation between pitch radii, helix angle, pressure angle, radii of curvature of engaging surfaces, normal diametral pitch, allowable tooth surface stress, and effective moduli of elasticity, such that when said pair is transmitting the maximum allowable torque the segment of the elliptical boundary of the contact area between said teeth furthest removed from said pitch line is substantially tangent to the addendum surface of the larger of said pair, said pressure angle being greater than 40°.

43. A pair of mating gears according to claim 42 wherein said pressure angle is larger than 40°, whereby the shearing action tangential to said tooth profiles associated with compressive deformation of the tooth faces when said pair is transmitting torque offsets most of the shearing action in the opposite direction imposed by the meshing of said teeth.

44. A pair of mating gears according to claim 42 wherein said pressure angle is larger than 45°, whereby the shearing action tangential to said tooth profiles associated with compressive deformation of the tooth faces when said pair is transmitting torque offsets all of the shearing action in the opposite direction imposed by the meshing of said teeth.

45. A pair of mating gears according to claim 42 wherein the face width times the tangent of the helix angle divided by the circular pitch is substantially equal to an integer.

46. A pair of mating gears according to claim 42 wherein said profiles extend on both sides of the pitch surfaces of said pair.

47. A pair of mating gears according to claim 42 wherein the centers of curvature of said active profiles of the teeth of one of said pair are substantially removed from the pitch surface of said one of said pair.

48. A pair of mating gears according to claim 42 wherein said profiles are circular arcs.

49. A pair of mating gears according to claim 42 wherein the active profiles of said teeth in the normal plane are circular arcs.

50. A pair of mating gears according to claim 42 wherein the square of the cotangent of the pressure angle in planes normal to said pitch line is substantially equal to one minus the quotient of the relative radius of curvature of said profiles times the sum of the reciprocals of the pitch radii of said pair divided by the sine of said pressure angle.

51. A pair of mating gears according to claim 42 wherein a semifluid lubricant is stored in at least one recess in one of said pair.

52. A pair of mating gears according to claim 42 wherein the tooth surfaces of one of said pair are treated with a solid lubricant.

53. A pair of mating gears according to claim 42 wherein the engaging surfaces of said teeth of one of said pair are formed of a soft resilient material supported by a metallic substructure.

54. A pair of mating gears according to claim 42 wherein said teeth of one of said pair are formed of a moldable material.

55. A pair of mating gears according to claim 42 wherein one of said pair has teeth of soft resilient material and the other has teeth of metal adapted to facilitate heat dissipation from one of said pair.

* * * * *

UNITED STATES PATENT OFFICE
CERTIFICATE OF CORRECTION

Patent No. 3,824,873     Dated July 23, 1974

Inventor(s) William S. Rouverol

It is certified that error appears in the above-identified patent and that said Letters Patent are hereby corrected as shown below:

Column 2, line 26, "5-" should read -- is --. Column 3, line 12, after "line", cancel the period; line 66, "Nothing" should read -- Noting --. Column 4, equation 7, "$0_1^2$" should read -- $\theta_1^2$ --; equation 10, "[1G]" should read -- [1/G] --, and "$r_1$" should read -- $r_i$ --; line 48, "$\theta$" should read -- $\emptyset$ --. Column 6, equation 22, "(1/1-K)" should read -- 1/1-K --.

Signed and sealed this 19th day of November 1974.

(SEAL)
Attest:

McCOY M. GIBSON JR.       C. MARSHALL DANN
Attesting Officer          Commissioner of Patents